United States Patent [19]

Nebelung et al.

[11] Patent Number: 4,530,711
[45] Date of Patent: Jul. 23, 1985

[54] TAKE-OUT MECHANISM FOR A GLASSWARE FORMING MACHINE

[75] Inventors: Hermann H. Nebelung; Fritz Futterknecht, both of Zurich, Switzerland

[73] Assignee: Emhart Industries, Inc., Farmington, Conn.

[21] Appl. No.: 666,598

[22] Filed: Oct. 31, 1984

[30] Foreign Application Priority Data

Nov. 16, 1983 [GB] United Kingdom ............... 8330574

[51] Int. Cl.³ .............................................. C03B 9/44
[52] U.S. Cl. ...................................... 65/260; 65/239; 65/241
[58] Field of Search .................... 65/239, 241, 260

[56] References Cited

U.S. PATENT DOCUMENTS

| | | | |
|---|---|---|---|
| 1,211,611 | 1/1917 | Meyer et al. | 65/260 X |
| 1,700,326 | 1/1929 | Miller | 65/239 X |
| 1,787,635 | 1/1931 | Lynch et al. | 65/260 X |
| 1,935,739 | 11/1933 | Freese | 65/260 |
| 2,038,518 | 4/1936 | Badger et al. | 65/239 X |
| 2,253,155 | 8/1941 | Wadman et al. | 65/260 |

*Primary Examiner*—Arthur Kellogg
*Attorney, Agent, or Firm*—H. Samuel Kieser

[57] ABSTRACT

The take-out mechanism comprises gripper members and driving means operable to move an operating rod vertically to move the gripper members between gripping and releasing conditions thereof. The driving means comprises a cam which engages opposed surfaces of the operating rod, and motor means to turn the cam through a preselected angle to move the operating rod vertically. The cam maintains contact with the opposed surfaces of the operating rod throughout movement thereof so that the operating rod and, therefore, the gripping members are positively positioned.

9 Claims, 3 Drawing Figures

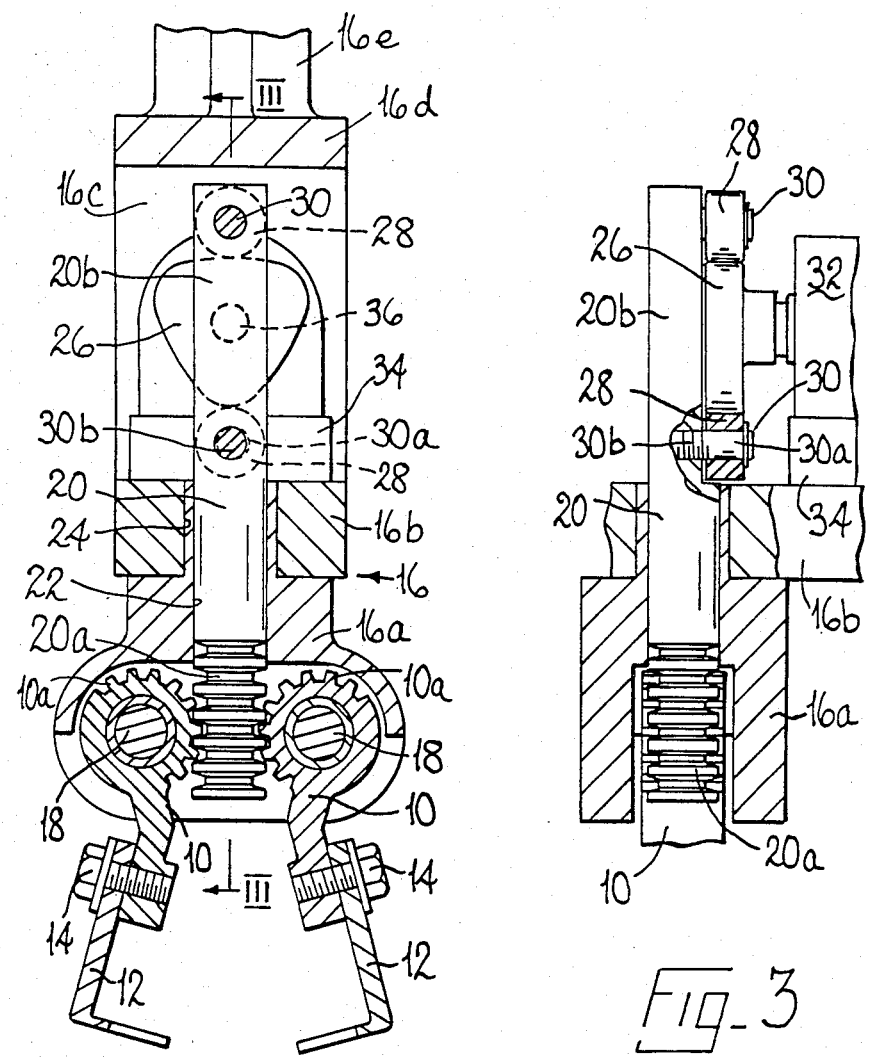

TAKE-OUT MECHANISM FOR A GLASSWARE FORMING MACHINE

BACKGROUND OF THE INVENTION

This invention is concerned with a take-out mechanism for a glassware forming machine operable to remove articles from a mould of the glassware forming machine.

In glassware forming machines of the so-called "individual section" type, a take-out mechanism is used to removed newly moulded articles of glassware from moulds of the machine and position them on a deadplate of the machine for subsequent removal to a conveyor which removes the articles from the machine. The take-out mechanism comprises two opposed gripping members movable towards one another into a gripping condition thereof and away from one another into a releasing condition thereof. The gripping members are mounted to turn as a unit about a horizontal axis to maintain an article gripped thereby in a vertical alignment while an arm on which the gripping members are mounted is moved in an arc about a further horizontal axis. Movement of the arm about the further horizontal axis moves the gripping members between a first position thereof at which they can grip an article in a mould of the machine and a second position thereof at which the gripping members can release the article on to the deadplate of the machine.

In a conventional take-out mechanism, the gripper members are mounted on gripper member supports which are pivoted together after the manner of scissors and are moved by a piston and cylinder assembly acting on a toggle which is linked to the gripper member supports. It is also possible to provide a rack on a piston rod of the piston and cylinder assembly which meshes with arcuate racks on the gripper member supports so that movement of the piston rod causes the gripper member supports to pivot about horizontal axes on which they are mounted. The piston and cylinder assembly is pneumatically operated to move the gripper members into their gripping condition and is operated either pneumatically or by means of a spring to move the gripper members into their releasing condition. Thus, during movement of the arm, the gripper members are held in position either by pneumatic pressure or by spring pressure so that it is possible for them to move to a small extent as they are not positively held in position. If such movement occurs, the gripper members may collide with an article which they are about to grip or damage an article which they are carrying.

It is an object of the present invention to provide a take-out mechanism in which the gripper members are positively held in their gripping and releasing conditions so that the likelihood of damage to articles of glassware is reduced.

BRIEF SUMMARY OF THE INVENTION

The invention provides a take-out mechanism operable to remove articles from a mould of a glassware forming machine, the mechanism comprising two gripper member supports on which gripper members are mounted for movement towards one another into a gripping condition thereof or away from one another into a releasing condition thereof, a carrier on which each gripper support is mounted for pivoting movement about a horizontal axis to move the gripper member mounted thereon between its gripping and releasing conditions, operating means operable to pivot the gripper supports as aforesaid, and moving means operable to move the carrier between a first position thereof at which the gripping members can grip an article and a second position thereof at which the gripping members can release the article on to a support, the operating means comprising an operating rod mounted on the carrier for longitudinal movement in a vertical direction, and driving means operable to move the operating rod in the vertical direction, the operating rod being connected to the gripper members supports so that, when the operating rod is moved in the vertical direction, the gripper supports are caused to pivot as aforesaid, wherein the driving means comprises a cam mounted on the carrier which engages two opposed surfaces of the operating rod, and motor means operable to turn the cam through a preselected angle about a horizontal axis which passes between the opposed surfaces, the profile of the cam being such that, when the motor means moves the cam through the preselected angle, the operating rod is caused to move downwardly and, when the motor means next moves the cam through the preselected angle, the operating rod is caused to move upwardly, and, throughout its movement through the preselected angle, the cam has a constant extent along a line joining points of contact thereof with the opposed surfaces so that the cam maintains contact with both opposed surfaces.

In a take-out mechanism according to the last preceding paragraph, the cam positively positions the operating rod which in turn positively positions the gripper members so that, when the gripper members are in their releasing or gripping conditions they are held against movement.

Conveniently, the opposed surfaces of the operating rod are provided by two rollers mounted for turning movement about horizontal axes. In order to enable the opposed surfaces to be brought into contact with the cam, one of the rollers may have its axis provided by a pin which has an eccentric portion so that the pin can be turned to adjust the distance between the rollers.

The cam profile of the cam may have three lobes spaced at 120° angles around the cam, the preselected angle being 60°.

In order to provide greater accuracy by using motor means having a fixed stroke, the motor means may be arranged to move the cam through the preselected angle in opposite directions during alternate operations thereof. Conveniently, the motor means comprises a rotary hydraulic motor having a drive shaft on which the cam is mounted.

Since a take-out mechanism is frequently required to remove articles of glassware simultaneously from two adjacent moulds of the machine, the take-out mechanism may comprise two further gripper member supports mounted on the carrier on which supports further gripper members are mounted, a further operating rod mounted on the carrier for longitudinal movement in a vertical direction, the further operating rod being connected to the further gripper member supports so that, when the further operating rod is moved in the vertical direction, the further gripper member supports are caused to pivot to move the further gripper members towards one another into a gripping condition thereof or away from one another into a releasing condition thereof, and a further cam which engages two opposed surfaces of the further operating rod and has the same profile as the first-mentioned cam, the further cam being mounted on a further drive shaft of the rotary hydraulic motor to be turned through the preselected angle about a horizontal axis which passes between the opposed surfaces of the further operating rod so that the operating rod and the further operating rod are moved simultaneously when the motor is operated. Conveniently, the connection between the or each operating rod and its associated gripper member supports comprises a toothed surface on each support which is arcuate about the axis about which the support pivots and is meshed with a toothed rack formed on the operating rod.

In order to enable the gripper members to be reorientated about a vertical axis if desired, the rack formed on the operating rod may be formed on a cylindrical portion thereof and each tooth of the rack may extend all the way around the cylindrical portion. This enables the toothed surfaces of the gripper member supports to engage the rack on the operating rod in different orientations about the vertical axis.

BRIEF DESCRIPTION OF THE DRAWINGS

There now follows a detailed description, to be read with reference to the accompanying drawings, of a take-out mechanism which is illustrative of the invention. It is to be understood that the illustrative take-out mechanism has been selected for description by way of example and not of limitation of the invention.

In the drawings:

FIG. 2 is a cross-sectional view taken on the line II—II in FIG. 1; and

FIG. 3 is a cross-sectional view taken on the line III—III in FIG. 2.

DETAILED DESCRIPTION OF PREFERRED EMBODIMENT OF THE INVENTION

Figure 1:
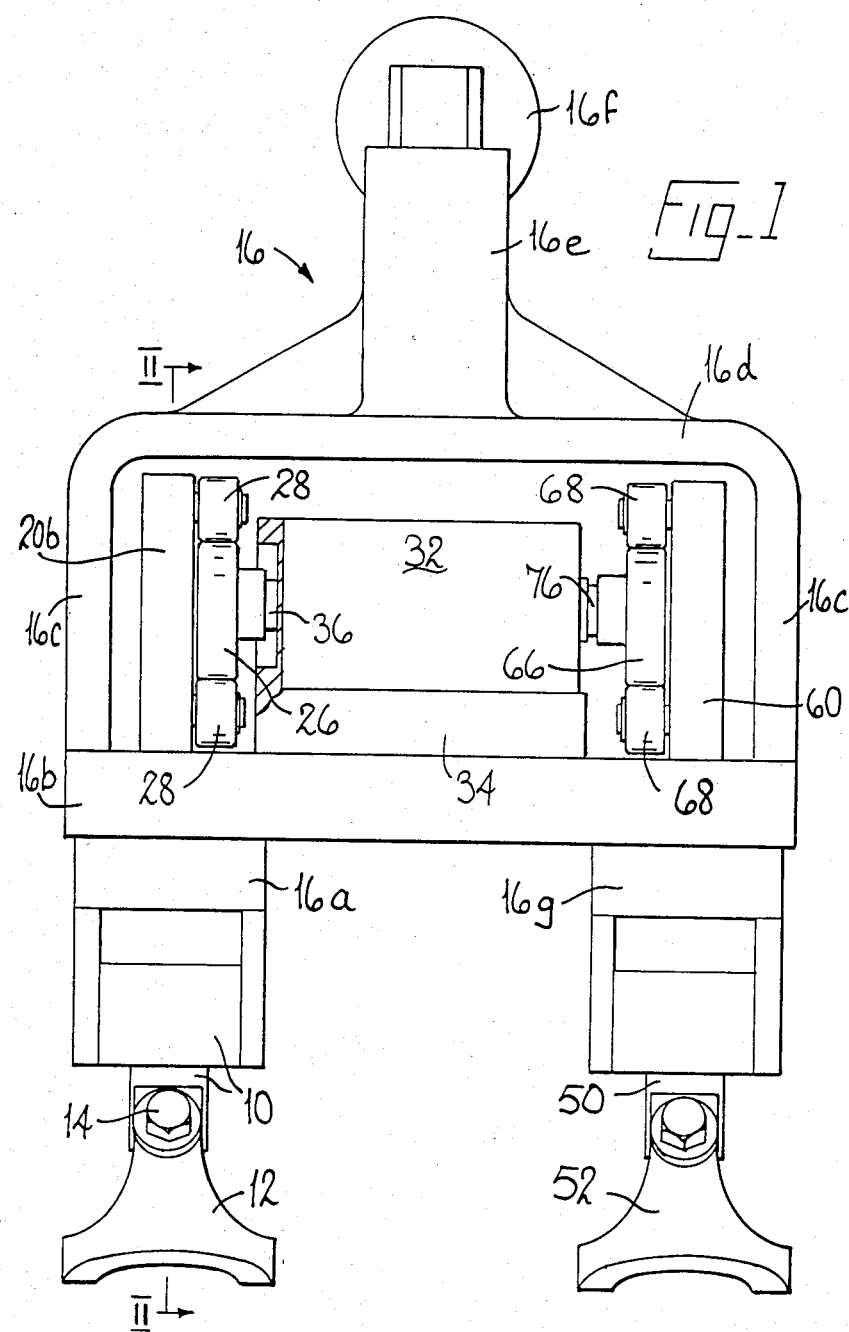
FIG. 1 is a side elevational view of the illustrative take-out mechanism.

The illustrative take-out mechanism shown in the drawings is operable to remove articles from a mould of a glassware forming machine of the individual section type. The illustrative mechanism comprises two gripper member supports 10 on which gripper members 12 are mounted for movement towards one another into a gripping condition thereof or away from one another into a releasing condition thereof (shown in FIG. 2). The gripper members 12 are mounted on the gripper member supports 10 by means of screws 14. In their gripping condition, the gripping members 12 are arranged to grip a neck portion of a bottle within a mould of the glassware forming machine so that the bottle can be removed from the mould.

The illustrative take-out mechanism also comprises a carrier 16 on which each gripper support 10 is mounted for pivoting movement about a horizontal axis provided by a shaft 18 associated with each gripper member support 10 to move the gripper member 12 mounted on the support 10 between its gripping and releasing conditions. Each shaft 18 extends in a horizontal direction between two vertical-extending wall portions of a removable portion 16a of the carrier 16 which is secured to the remainder of the carrier 16 by screws (not shown).

The carrier 16 comprises, in addition to the removable portion 16a, a horizontally extending plate portion 16b to which the portion 16a is screwed, two vertically extending pillar portions 16c which extend upwardly from opposite ends of the plate portion 16b and serve to support the portion 16b, a bridge portion 16d connecting upper end portions of the pillar portion 16c, a vertically-extending shaft portion 16e which extends upwardly from a central portion of the bridge portion 16d, and a vertically-extending flange 16f secured to an upper portion of the shaft portion 16e. The carrier 16 is secured, by means of screws (not shown) which pass through holes in the flange portion 16f thereof, to moving means (not shown) of the illustrative take-out mechanism which is operable to move the carrier between a first position thereof at which the gripping members 12 can grip an article and a second position thereof at which the gripping members 12 can release the article on to a deadplate of the glassware forming machine. The moving means is of a conventional type and comprises an arm which turns about a horizontal axis through approximately 180° to move the carrier 16 between its first and second position. The moving means also comprises means for maintaining the carrier 16 in vertical alignment during the movement. As the moving means is of conventional construction and is well known to those skilled in the art, it will not be described in detail herein.

The illustrative take-out mechanism also comprises operating means operable to pivot each gripper support 10 about its horizontal axis to move the gripper members 12 between their gripping and releasing conditions. The operating means comprises an operating rod 20 mounted on the carrier 16 for longitudinal movement in a vertical direction. The operating rod 20 has a lower cylindrical portion 20a on which a toothed rack is formed, each tooth of the rack extending all the way around the cylindrical portion 20a. The cylindrical portion 20a extends between the shafts 18 and is meshed with a toothed surface 10a on each support 10 which is arcuate about the axis of the shaft 18 about which the support 10 pivots (see FIG. 2). The arrangement is such that, when the operating rod 20 moves in the vertical direction the engagement between the rack on the cylindrical portion 20a and the arcuate toothed surfaces 10a causes the gripper member supports 10 to pivot about their horizontal axes, one support 10 being pivoted clockwise and the other support 10 being pivoted anti-clockwise so that the gripper members 12 are moved either towards one another into a gripping condition thereof or away from one another into a releasing condition thereof. The operating rod 20 extends vertically upwards through a cylindrical passage 22 in the portion 16a of the carrier which is formed in a hollow cylindrical portion of the portion 16a which extends upwardly through a cylindrical passage 24 in the plate portion 16b of the carrier. An upper portion 20b of the operating rod 20 is in a space formed above the plate portion 16b, between the pillar portions 16c and beneath the bridge portion 16d of the carrier 16.

The operating means of the illustrative take-out mechanism also comprises driving means operable to move the operating rod 20 in the vertical direction. The driving means comprises a cam 26 which is mounted on the carrier 16 and engages two opposed surfaces of the operating rod 20 which are provided by two rollers 28 (see FIG. 3) which are mounted on pins 30 which project horizontally from the operating rod 20. The driving means also comprises motor means operable to turn the cam 26 through a preselected angle. The motor means is provided by a rotary hydraulic motor 32 mounted on a base 34 on top of the plate portion 16b of the carrier 16. The motor 32 receives its supply of hydraulic fluid through passages (not shown) which pass through the portions 16f and 16e and are connected to inlet ports (not shown) of the motor 32 by pipes (not shown).

The cam 26 (see FIG. 2) is arranged to be rotated by the motor 32 about a horizontal axis which passes between the rollers 28. The profile of the cam 26 is such that, when the motor 32 moves the cam 26 through the preselected angle, the operating rod 20 is caused to move downwardly and, when the motor 32 next moves the cam through the preselected angle, the operating rod 20 is caused to move upwardly. Throughout its movement through the preselected angle, the cam 26 has a constant extent along a line joining point of contact thereof with the rollers 28 so that the cam 26 maintains contact with both rollers 28 and the position of the operating rod 20 is continuously positively defined. Thus, as the position of the operating rod is positively defined, the position of the supports 10 and the gripper members 12 is also positively defined and the gripper members 12 cannot move while in their gripping or releasing conditions. As can be seen from FIG. 2, the cam 26 has a profile which has three lobes spaced at angles 120° from one another, the profile being generally triangular and the cam 26 having a constant extent along any straight line passing through the axis 34. FIG. 2 shows the operating rod 20 in a lower position thereof in which one of the lobes of the cam 26 is engaging the lower roller 28 while the upper roller 28 is engaged by the cam halfway between two of its lobes, the gripper members 12 being in their releasing condition. In order to move the operating rod 20 upwards to bring the gripper members 12 to their gripping condition, the cam 26 is turned by the motor 32 through 60°, thereby bringing one of the lobes of the cam 26 into engagement with the upper roller 28 and the lower roller 28 into engagement with a position halfway between two of the lobes. The cam 26 is mounted on a drive shaft 36 of the motor 32 which extends horizontally from the motor 32 and the motor 32 is arranged to turn the drive shaft 36, and therefore the cam 26, through 60° about the horizontal axis each time the motor is operated, the rotation being in opposite directions on alternate operations of the motor 32. Thus, more precise control of the gripping and releasing conditions of the gripper members 12 can be achieved since the motor 32 can be a constant stroke device giving better control than if the cam 26 were rotated round and round to bring about a required motion.

In order to enable the distance between the rollers 28 to be adjusted so that the required force between the cam 26 and the rollers 28 is achieved, one of the rollers 28 has its axis provided by a pin 30 that has an eccentric portion so that the pin can be turned to adjust the distance between the rollers 28. Thus, the lower pin 30 has a cylindrical portion 30a forming an axis for the roller 28 and a cylindrical portion 30b which is received in the remainder of the operating rod 20 and is offset from the portion 30a thereof.

In order to enable the illustrative take-out mechanism to simultaneously remove two articles from adjacent moulds of a glassware forming machine, the illustrative take-out mechanism comprises two further gripper member supports 50 mounted on the carrier 16 on which supports further gripper members 52 are mounted. The supports 50 are carried by two further support rods (not shown) similar to the support rods 18 which are carried on a further removable portion 16g of the carrier 16 which is identical to the removable portion 16a. The illustrative take-out mechanism also comprises a further operating rod 60 mounted on the carrier 16 for longitudinal movement in a vertical direction, the further operating rod 60 being connected to the supports 50, in similar manner to the connection between the supports 10 and the operating rod 20, so that when the operating rod 60 is moved in the vertical direction the supports 50 are caused to pivot to move the gripper members 52 towards one another into a gripping condition thereof or away from one another into a releasing condition thereof. A further cam 66 engages two opposed surfaces of the operating rod 50 which are provided by rollers 68 similar to the rollers 28, the cam 66 being of identical shape to the cam 26. The cam 66 is mounted on a further drive shaft 76 of the motor 32 to be turned through the preselected angle (60°) about the horizontal axis which also passes between the opposed surfaces provided by the rollers 68 so that the operating rod 20 and the further operating rod 60 are moved simultaneously when the motor 32 is operated.

As the teeth on the cylindrical portions of the operating rods 20 and 60 extend all the way around the operating rods, it is possible to re-orientate the gripping members 12 and 52 in a horizontal plane by unscrewing the portions 16a and 16g from the plate portion 16b, turning each portion 16a and 16g about a vertical axis of its respective operating rod 20 and 60, while maintaining the teeth of the arcuate portions of the supports 10 and 50 in mesh with the teeth of the operating rods 20 and 60, and re-screwing the portions 16a and 16g to the plate portion 16b in the new orientation.

We claim:

1. A take-out mechanism operable to remove articles from a mould of a glassware forming machine, the mechanism comprising two gripper member supports on which gripper members are mounted for movement towards one another into a gripping condition thereof or away from one another into releasing condition thereof, a carrier on which each gripper support is mounted for pivoting movement about a horizontal axis to move the gripper member mounted thereon between its gripping and releasing conditions, operating means operable to pivot the gripper member supports as aforesaid, and moving means operable to move the carrier between a first position thereof at which the gripping members can grip an article and a second position thereof at which the gripping members can release the article on to a support, the operating means comprising an operating rod mounted on the carrier for longitudinal movement in a vertical direction, and driving means operable to move the operating rod in the vertical direction, the operating rod being connected to the gripper member supports so that, when the operating rod is moved in the vertical direction, the gripper member supports are caused to pivot as aforesaid, wherein the driving means comprises a cam mounted on the carrier which engages two opposed surfaces of the operating rod, and motor means operable to turn the cam through a preselected angle about a horizontal axis which passes between the opposed surfaces, the profile of the cam being such that, when the motor means moves the cam through the preselected angle, the operating rod is caused to move downwardly and, when the motor means next moves the cam through the preselected angle, the operating rod is caused to move upwardly, and, throughout its movement through the preselected angle, the cam has a constant extent along a line joining points of contact thereof with the opposed surfaces so that the cam maintains contact with both opposed surfaces.

2. A take-out mechanism according to claim 1, wherein the opposed surfaces of the operating rod are provided by two rollers mounted for turning movement about horizontal axes.

3. A take-out mechanism according to claim 2, wherein one of the rollers has its axis provided by a pin which has an eccentric portion so that the pin can be turned to adjust the distance between the rollers.

4. A take-out mechanism according to claim 1, wherein the cam profile has three lobes spaced at 120° angles around the cam, the preselected angle being 60°.

5. A take-out mechanism according to claim 1, wherein the motor means is arranged to move the cam through the preselected angle in opposite directions during alternate operations thereof.

6. A take-out mechanism according to claim 5, wherein the motor means comprises a rotary hydraulic motor having a drive shaft on which the cam is mounted.

7. A take-out mechanism according to claim 6, wherein the take-out mechanism comprises two further gripper member supports mounted on the carrier on which supports further gripper members are mounted, a further operating rod mounted on the carrier for longitudinal movement in a vertical direction, the further operating rod being connected to the further gripper member supports so that, when the further operating rod is moved in the vertical direction, the further gripper member supports are caused to pivot to move the further gripper members towards one another into a gripping condition thereof or away from one another into a releasing condition thereof, and a further cam which engages two opposed surfaces of the further operating rod and has the same profile as the first-mentioned cam, the further cam being mounted on a further drive shaft of the rotary hydraulic motor to be turned through the preselected angle about a horizontal axis which passes between the opposed surfaces of the further operating rod so that the operating rod and the further operating rod are moved simultaneously when the motor is operated.

8. A take-out mechanism according to any one of claims 1 to 7, wherein the connection between the or each operating rod and its associated gripper member supports comprises a toothed surface on each support which is arcuate about the axis about which the support pivots and is meshed with a toothed rack formed on the operating rod.

9. A take-out mechanism according to claim 8, wherein the rack formed on the operating rod is formed on a cylindrical portion thereof and each tooth of the rack extends all the way around the cylindrical portion.

* * * * *